US00RE39003E

(19) United States
(12) Reissued Patent
Orr et al.

(10) Patent Number: US RE39,003 E
(45) Date of Reissued Patent: Mar. 7, 2006

(54) CLOSED CAPTION SUPPORT WITH TIMEWARP

(75) Inventors: Stephen J. Orr, Markham (CA); Antonio Rinaldi, Maple (CA)

(73) Assignee: ATI Technologies Inc., Markham (CA)

(21) Appl. No.: 09/047,176

(22) Filed: Mar. 24, 1998

Related U.S. Patent Documents

Reissue of:
(64) Patent No.: 5,537,151
Issued: Jul. 16, 1996
Appl. No.: 08/197,336
Filed: Feb. 16, 1994

(51) Int. Cl.
*H04N 5/445* (2006.01)

(52) U.S. Cl. ..... 348/564; 348/468; 348/588
(58) Field of Classification Search ..... 348/564, 348/588, 468, 589, 598, 600, 552, 739, 465; H04N 5/445
See application file for complete search history.

(56) References Cited

U.S. PATENT DOCUMENTS

| | | | | | |
|---|---|---|---|---|---|
| 4,894,789 | A | * | 1/1990 | Yee | 348/468 |
| 4,954,882 | A | * | 9/1990 | Kamemoto | 348/468 X |
| 5,023,721 | A | * | 6/1991 | Moon-Hwan | 348/468 X |
| 5,109,279 | A | * | 4/1992 | Ando | 348/468 X |
| 5,111,296 | A | * | 5/1992 | Duffield et al. | 348/552 |
| 5,138,450 | A | * | 8/1992 | Fukuda et al. | 348/564 |
| 5,262,860 | A | * | 11/1993 | Fitzpatrick | 348/468 |
| 5,404,172 | A | * | 4/1995 | Berman et al. | 348/465 |
| 5,579,057 | A | * | 11/1996 | Banker et al. | 348/589 |
| 6,331,877 | B1 | * | 12/2001 | Bennington et al. | 348/731 |

* cited by examiner

*Primary Examiner*—Victor R. Kostak
(74) *Attorney, Agent, or Firm*—Vedder, Price, Kaufman & Kammholz, P.C.

(57) ABSTRACT

Method of providing closed captioned data to a television viewer comprised of detecting closed captioned data signals transmitted in conjunction with a television signal, decoding the data signals to caption display signals, and displaying the caption display signals on an auxiliary screen separate from a screen displaying the television signals.

20 Claims, 4 Drawing Sheets

CLOSED CAPTION SUPPORT WITH TIMEWARP

Figure 1:
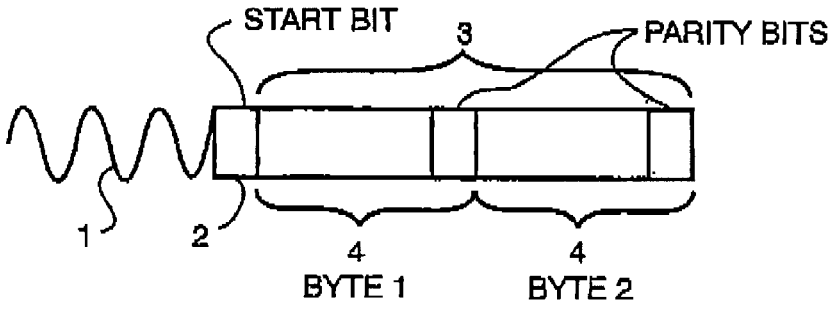

Matter enclosed in heavy brackets [ ] appears in the original patent but forms no part of this reissue specification; matter printed in italics indicates the additions made by reissue.

FIELD OF THE INVENTION

This invention relates to methods of displaying closed captioned text transmitted in conjunction with a television signal.

BACKGROUND TO THE INVENTION

In order to aid the hearing impaired, written text corresponding to spoken dialog is encoded into transmitted television signals. This text is decoded in a decoder at the viewing location of the television program, and is displayed over the video signal of the television set, whereby the audio portion of a transmitted program may be read from the television screen. The text is typically displayed adjacent the bottom of the television screen. The encoding of the text signal into the television signal whereby it is not displayed unless decoded is referred to a closed captioning.

A North American closed captioning standard was originally proposed by The Closed Captioning Association and the Public Broadcasting System (PBS). The standard is defined by the FCC in FCC document FCC-91-119 and in the FCC Federal Register Vol. 56 No 114.

The standard specifies that closed captioned data should be transmitted on scan line 21 of every odd video field of the North American interlaced video signal. The closed captioned signal is sent as a black and white (luminance only) signal with no color component. Each odd video field which contains closed captioned data is prefixed with a 0.5035 MHz sinusoidal run-in signal which is intended to be used at the decoder to lock to the closed captioned data. This run-in signal is illustrated as element 1 in FIG. 1. A start bit 2 immediately follows the run-in signal 1, which is immediately followed by 16 bits of closed captioning data 3, These bits form two 7 bit ASCII codes plus odd parity bits, forming two bytes 4 of closed captioned data. These two bytes can define text or define color, style, and attribute information. The bytes may also contain information which controls the mode of the decoder, which defines whether the text should be shown full screen, 2, 3 or 4 line roll up, paint on, and pop on. Cursor positioning data may also be defined.

In prior art closed captioned signal decoding systems a decoder is connected between the incoming video signal and the television set. When activated, the decoder decodes the closed captioned data signal and produces a video signal containing the closed captioned text, which replaces part or all of a television program which is being watched. The result is that some portion of the broadcast image is obscured by the closed captioned text. Further, passing through the decoder the image to be displayed on the television screen may be degraded.

SUMMARY OF THE INVENTION

The present invention provides a method whereby persons with a personal computer may obtain and view closed captioned text without obscuring any portion of the television image. Further, it provides a method whereby the closed captioned text may be controlled in ways in addition to or in substitution for that specified by the closed captioned control bytes.

In accordance with the present invention, the video signal may displayed on a television screen with no closed captioned text, and closed captioned text may be displayed on a totally separate display screen that may be placed adjacent the television screen.

The font and font size may be changed to any pleasing font and size as desired by the user, the color and background, and the display mode may be controlled to whatever is desired by the user.

In accordance with another embodiment, the video program may be displayed without obstruction in a window on a single display screen, and the closed captioned text may *be* displayed in a separate window on the same display screen. The positioning and sizes of either or both of the video program and closed captioned text windows on the display screen may be controlled to whatever is desired by the user.

The result is an improvement in the usability of the television program with closed captioned text, since at the same time the entire video program may be viewed without obstruction by the closed captioned text, and the character of the text, its display mode and placement on the screen may be completely controlled by the user. Since the size of the windows may be controlled, a user who is both hearing and seeing impaired may optimize the video and text sizes to suit the disability of the user.

In accordance with an embodiment of the present invention, the video signal is applied to a video interface circuit of a computer, where closed captioned text is detected and decoded. The closed captioned text is applied to the computer display screen, with parameters controllable by the user. The computer display screen may be placed adjacent *to* a television screen which displays the television program without closed captioned text, whereby both screens are visible at the same time by the user. Since the program displayed by the television screen does not pass through a decoder, degradation thereby is avoided, yet the closed captioned text is available to the user.

In accordance with another embodiment, the video signal is applied to a video interface circuit of a multimedia computer. The live motion video signal is provided by the computer to a window on the computer display. The closed captioned data is captured and is placed in a separate window on the computer display. The computer is used to vary the sizes and locations of the windows containing the live motion video and the closed captioned data, as well as the character of the text, its background, the remaining screen "wallpaper", etc.

It should be understood that while the description herein will be directed to a separate and free standing computer, the present invention can be built into and form part of a television set, or may be disguised as a television set or the equivalent. It may be built into a home entertainment and utility product which contains audio controls, a VCR, a video screen, home security modules, a computer, etc.

In accordance with an embodiment of the invention, a method of providing closed captioned data to a television viewer is comprised of detecting closed captioned data signals transmitted in conjunction with a television signal, decoding the data signals to caption display signals, and displaying the caption display signals on an auxiliary screen separate from a screen displaying the television signals.

In accordance with another embodiment, the method described above further includes providing the caption display signals to a computer microprocessor, providing the television signal to a computer video display circuit, processing the caption data signals to control at least the location of display of the decoded signal, displaying the television signal on a display screen and displaying the caption display signals at the location on said display screen, the television screen being a window displayed on a computer screen, the decoded data being contained in a window on the display screen and constituting the auxiliary screen.

BRIEF INTRODUCTION TO THE DRAWINGS

Figure 2A:
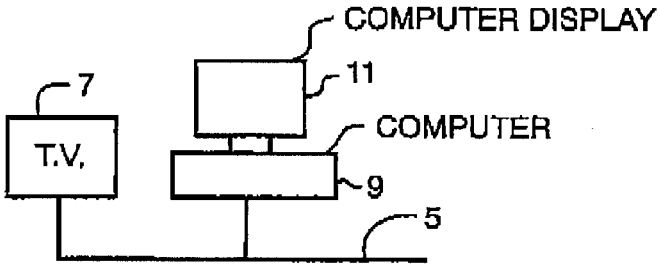
Figure 2B:
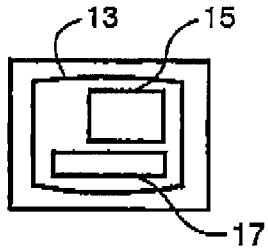
Figure 4:
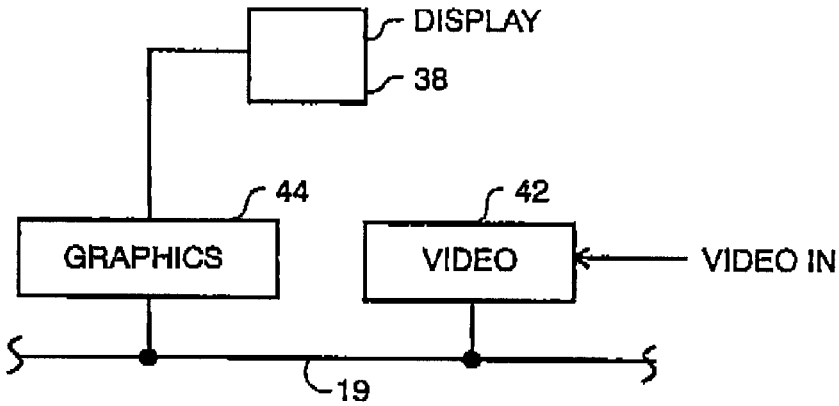
Figure 3:
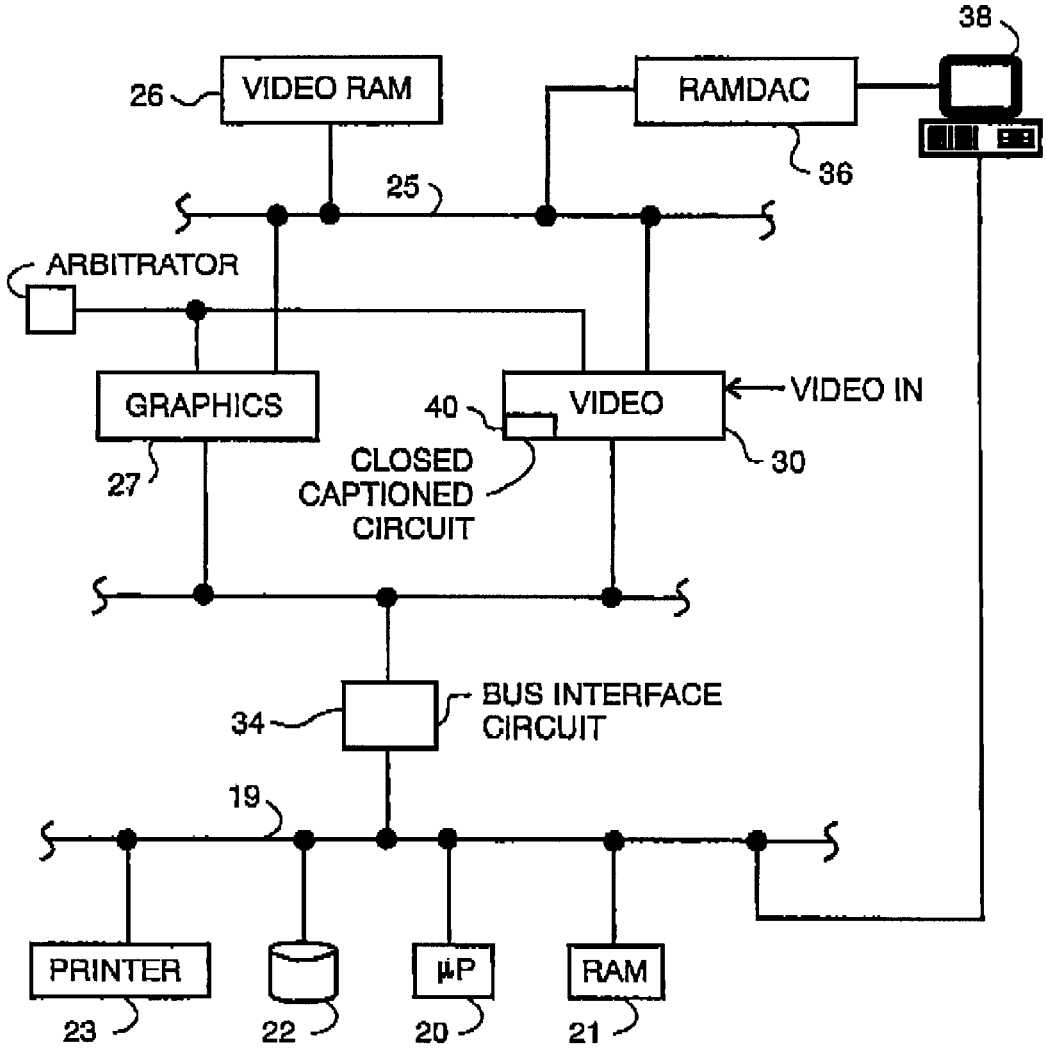
Figure 5:
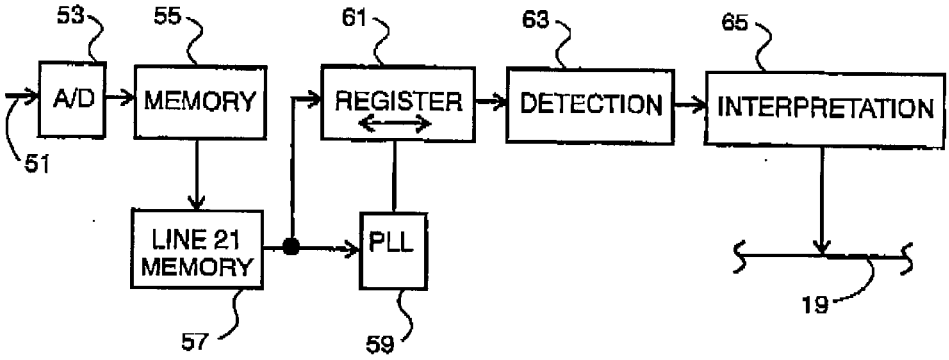
Figure 6:
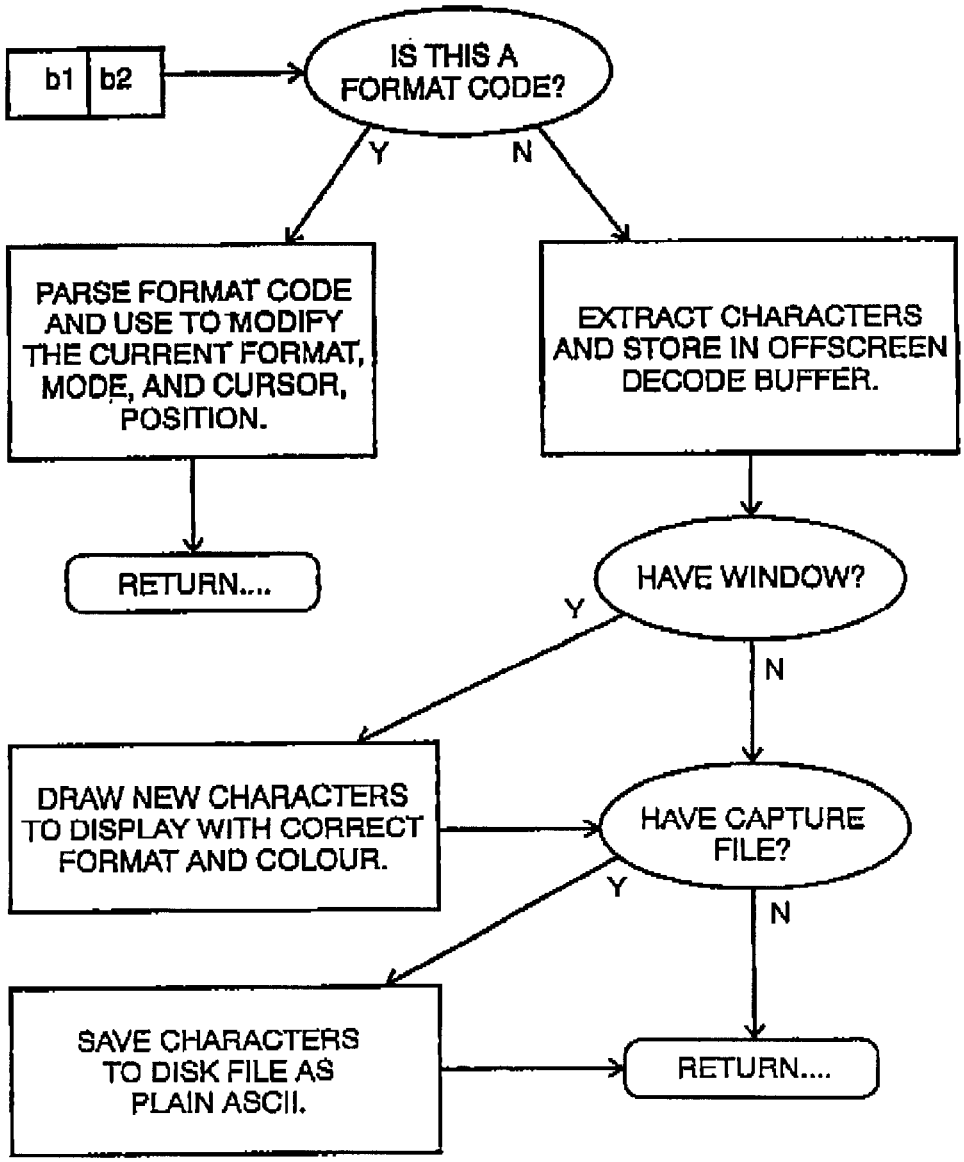

A better understanding of the invention will be obtained by reading the description of the invention below, with reference to the following drawings, in which:

FIG. 1 illustrates the form of a closed captioned signal transmitted with a standard television signal, FIG. 2A illustrates a display screen of a television program and a separate display of closed captioned text on a separate display screen in accordance with an embodiment of the invention, FIG. 2B illustrates a single display screen containing separate windows, one containing and displaying a full motion video program and the other containing and diplaying closed captioned text, FIG. 3 [is] *illustrates* a block diagram of the architecture of a multimedia computer on which an embodiment of the present invention may be carried out, FIG. 4 [is] *illustrates* a block diagram of a part of the architecture of a standard non-multimedia computer on which another embodiment of the present invention may be carried out, FIG. 5 [is] *illustrates* a block diagram of a part of a video interface circuit which can be used to carry out an embodiment of the present invention, and FIG. 6 [is] *illustrates* an algorithm used by the computer used to carry out the present invention.

DETAILED DESCRIPTION OF THE INVENTION

Turning now to FIG. 2A, a video signal containing a closed captioned signal is received via cable or antenna lead 5. The signal is fed to standard television set 7, and as well, to computer 9. Television set 7 displays the video signal without the closed captioned text. The computer contains a video interface circuit that decodes the closed captioned signal, and provides it to a computer display 11. The decoded closed captioned signal is at least temporarily resident in a random access memory (RAM) of the computer, its character such as font and font size, color, background, display mode such as roll on, etc., can be controlled by the computer. This may be enabled by the control codes in the closed captioned signal, or manually by the user, or partly by both.

Further, the closed captioned text data that is resident in RAM may be stored in a file on the hard disk drive of the computer, or on a floppy disk, whereby it may be later retrieved and printed out as a record of the spoken part of the program. This also provides *a* means for distributing printed materials to viewers of closed captioned data which may be different than that which is spoken.

FIG. 2B illustrates a multimedia computer screen 13 in accordance with another embodiment of the invention. In this case, the video signal is [only] provided to a [multimedia] computer video interface circuit, and is not provided to a separate television screen. The interface circuit digitizes the video signal and the computer places it into a full motion video window 15 on the computer display 13. The closed captioned text data is decoded, and is placed into a second window 17 on the computer display 13. Both the closed captioned text data and video signals are located respectively in video memory, and *at least temporarily in* RAM in the computer [at least temporarily in the computer], and therefore their characters may be manipulated. For example, the size, location and relative dimensions of the window displaying the video program may be changed to suit the program being transmitted, e.g. either standard or high definition. The size, location and relative dimensions of the window displaying the closed captioned text may be changed to suit the viewer. Since the text data is ASCII, it may be controlled to be displayed in any font and size supported by the computer, and as well in any color and on any background color or design supported by the computer.

FIG. 3 illustrates the architecture of a multimedia computer, such as one on which the present invention may be carried out. The computer is comprised of a main bus 19 to which a microprocessor 20, RAM 21, a hard disk drive 22 and a printer 23 via a serial or parallel port are connected. A high speed bus 25 having the capacity to carry data signals at live motion video rates has video RAM 26 connected to it, as well as graphics control circuit 27, and video interface circuit 30. [A mediating] *An arbitration* circuit 32 is connected to graphics control circuit 27 and to video interface circuit 30, to control which of the circuits 27, 30 has access to high speed bus 25. Each of the circuits 27, 30 is connected to a bus interface circuit 34, which is also connected to the host or system bus 19 for receiving control and data signals, and for providing signals thereto.

A random access memory and digital to analog converter (RAMDAC) 36 is connected to high speed bus 25 and converts video signals stored in video RAM 26 to analog signals. The analog signals are applied to a video monitor 38 for display.

The video monitor 38 corresponds preferably to computer display 13 referred to in respect of FIG. 2B, and could correspond to the display 11 referred to in respect of FIG. 2A. The display 11 need not be the display of a multimedia computer of the type illustrated in FIG. 3, and could be the standard display of a normal computer.

It is preferred that the computer on which the present invention is carried out is similar to the one described in U.S. patent application Ser. No. 08/092,477 filed Jul. 16, 1993, invented by Robert P. Bicevskis, Adrian H. Hartog, Gordon Caruk and Michael A. Alford entitled "Multi-Media Computer Architecture", which is incorporated herein by reference. However, any multimedia computer which can receive a video interface circuit that can operate as described herein and which can display live motion video in a controllable window while providing another window in which other material is shown can be used.

In operation, in accordance with the second embodiment, and as described in the aforenoted patent application, a video signal (which may have passed through a television tuner and thus is baseband video) is applied to the video interface circuit 30. The circuit digitizes the signal and stores it in video RAM 26. In conjunction with graphics circuit 27 which generates a window, the video signal is read out of video RAM 26, is scaled and timed to be contained within the window, and is applied to RAMDAC 36. The analog output signal is applied to video monitor 38 for display, e.g. as with respect to window 15 in FIG. 2B.

As will be described in more detail below, the video in line 21 of the odd video fields is detected and decoded *by the closed captioned circuit 40 of the video interface circuit 30*. The decoded data is stored in video RAM 26. It is then placed into another window by means of graphics circuit 27, which is scaled and timed to provide its size and display position using parameters provided under control of processor 20, and is sent to the RAMDAC 36 with other video data, to be displayed on video monitor 38, e.g. as window 17 on display 13 as in FIG. 2B.

The graphics circuit 27 or the video circuit 30 can also determine whether the closed captioned data is control data or ASCII text, and provide this data to the processor 20, which can analyze the control data and control the parameters of the displayed text accordingly. For example the control data can be looked up in a table stored in RAM 21 or in video circuit 30, to obtain instructions corresponding to the control data bytes, and send instructions to graphics circuit 27 to display the text accordingly. Alternatively, computer keyboard 24 can be used to select text style, size, display mode and other characteristics offered to the user on the display 38 in a setup procedure of a graphical user interface controlled by graphics circuit 27.

In accordance with the first embodiment of the invention, instead of using a multimedia form of computer such as that described above, a standard computer is used. In this case, a video interface circuit 42 is connected to the main bus 19 of the computer, to which the baseband video is applied. A graphics interface circuit 44 such as a well known VGA circuit is connected to the bus 19, to which a standard monitor such as a VGA monitor 38 is connected.

In this case, the video circuit 42 receives, detects and decodes the closed captioned signal from line 21 of the input video signal and applies it to bus 19 of the computer. Microprocessor 20 controls storage of the decoded closed captioned signal in RAM 21. It then accesses the signal to determine whether the signal is control code or ASCII text, and operates on the text in accordance with the control code, or in accordance with other control signals applied via keyboard 24 to display the text on video display 38. In this manner the size, color, background and display mode for the closed captioned text is controlled.

Indeed, the text may be inserted in a window on the screen, and the graphics circuit may be controlled by the control program and the microprocessor to perform other functions on the screen depending on the text or control codes. For example, in a set-up sequence in the event the closed captioned control code defines the color of the text to be displayed as green, the program can access a look-up table and display various colors of green to the user beside a window displaying the text, whereby the user, who may have some green color-blindness, can select the most legible color of green (or indeed some other color), for display. This data can be stored on the hard disk drive 22, for future reference, which can be accessed and used each time the closed captioned control code defines green as the display color.

Similarly, the graphics circuit can be controlled to provide other graphical and/or text in or around the closed captioned text, such as wallpaper, still or moving images, selection menus, a selection cursor, etc.

In either of the embodiments, the video interface circuit or the computer under control of the processor 20 carries out the following functions, as shown in FIG. 5.

A source of video containing a closed captioned data signal is carried via input line 51 to analog-to-digital converter 53. The resulting digital signal is captured in a memory 55 which is preferably local to the video interface circuit. Scan line 21 of every odd video field is extracted from memory 55 and is transferred to local memory 57 (such as memory 21 in FIG. 3). Once the scan line containing the closed captioned data is in the local memory, a software algorithm can be used to decode the closed captioned data and display it on a monitor or store it on a disk-based ASCII file.

The decoding phase of the process involves detecting and extracting the encoded data from the video stream, and then interpreting the data and translating it into displayable information.

The detecting phase involves applying samples of the signal shown in FIG. 1 to a phase locked loop (PLL) 59, which triggers on the zero crossings of the 0.5035 *MHz* run-in signal. The signal is also applied to register 61, to which the PLL is connected. The PLL thus determines the location within the captured scan line stored in register 61 of the 16 bits of closed captioned data. Alternatively, the PLL could determine the location by being coupled to memory 57, which of course functions as a register.

The data is then extracted by computing the average value of several samples in the location of each bit of data and determining whether the transmitted bit is a zero or a one based on a threshold, or based on an upper and lower threshold, in detector 63. This averaging and threshold procedure is repeated for each of the 16 bits of data to produce two bytes of odd parity closed captioned data for every field processed. Each byte has 7 significant bits (7 bit ASCII) and odd parity.

Because the data is fundamentally black and white, the detection function should examine either the luma (Y) portion of the signal, or the green portion of the signal, depending on whether the circuit is capturing YUV or RGB data. Green is preferred because typically when digitizing to 16 bits per pixel RGB data, the color component bit weight used is 565 (5 bits of red, 6 bits of green, and 5 bits of blue). This results in one extra bit of green data than red or blue, thus improving the accuracy of the data detection.

The output of the detection phase (detector 63) is then processed in the interpretation phase (interpreter 65). The interpretation algorithm is illustrated in FIG. 6, and involves parsing the two bytes of data which were extracted during the detection phase. Because some closed caption sequences are encoded as two bytes which are transmitted in the same field, the data bytes are preferably passed in pairs to interpreter 65, which maintains the display. The interpreter parses the ASCII byte pairs and interprets their meaning. It handles detection of all the various formatting codes which can be embedded in closed captioned data including color, style, and positioning information as well as the textual data itself, in accordance with the aforenoted FCC-91-119 standard. The data are applied to bus 19 whereby it can be dealt with by processor 20.

As shown in FIG. 6, the interpreter interprets each byte pair and decides what type of code the bytes represent. If the bytes are character data, then these bytes are placed into an internal table at the next cursor location and are drawn on the display using the current color and style (at startup the cursor should be set at 0,0 on the display, and the style should start as plain white text).

If the bytes are determined to be closed captioned control code then they are preferably used to modify the cursor position, pen color and style effecting the next text characters that are parsed. Decoded caption data is stored internally in a character map (or grid) with a single byte storing the character and a second byte storing the format of the character.

A pop-on caption mode should not render characters to the display, but instead should cache the characters until an "end-caption" command is received.

The stored data can then be provided using the graphics circuit 44 (FIG. 4) or 27 (FIG. 3) to the associated computer display, in a window generated by a resident graphics user interface (GUI), or generally on the screen without generating a GUI window.

While the various process steps have been illustrated as block elements, it is preferred that all of the process steps should be handled by software. For example the PLL is preferred to be a software PLL, the detection and interpretation module should be software modules, etc. The software modules can reside in RAM 21 (called from hard drive 22 when required), and can *be performed by* control processor 20 [to perform the required functions] as required by the steps described above and in FIG. 6.

It should be noted that the 0.5035 *MHz* run-in signal can be detected without a phase locked loop in software. For example, zero crossings of the run-in signal can be detected, and the closed captioned data located from that method. Other methods could be used within the skill of a person skilled in the art.

Closed captioned data can be transmitted in two different channels. In current systems, only one channel can be viewed at a time. Using the present invention, both channels can be decoded and *the captured closed caption data can be* displayed at the same time.

The closed captioned data control codes define 2, 3 and 4 line roll-up display modes to avoid obscuring parts of the video program display. The present invention can convert those modes to full screen (e.g. 15 line display ) without obscuring the video program being watched.

By allowing closed captioned text to be saved to a file on disk, a permanent record of a program can be kept. Thus a transcript can be used to facilitate looking back over earlier details, such as in news programs, lectures, etc.

A person understanding this invention may now conceive of alternative structures and embodiments or variations of the above. All of those which fall within the scope of the claims appended hereto are considered to be part of the present invention.

We claim:

[1. A method of providing closed captioned data to a television viewer comprising:

(a) detecting closed captioned data signals transmitted in conjunction with a television signal, (b) decoding said data signals to caption display signals, (c) displaying said caption display signals on an auxiliary screen separate from a screen displaying said television signals, (d) providing said caption display signals to a computer microprocessor, (e) providing said television signal to a computer video display circuit, (f) processing said caption data signals to control at least the location of display of said decoded signal, (g) displaying said television signal on a display screen and displaying said caption display signals at said location on said display screen, (h) said television screen being a window displayed on a computer screen, (i) said decoded data being contained in a window on said display screen and constituting said auxiliary screen.]

2. A [The] *A* method [of claim 1,] *for providing closed captioned data and video data on a display, the method comprises the steps of:*

*a) receiving a video signal that includes the closed captioned data and the video data;*

*b) decoding the closed captioned data to produce decoded closed captioned data;*

*c) digitizing the video data to produce digital video data;*

*d) associating the digital video data in a first window on the display;*

*e) associating the decoded closed captioned data in a second window for subsequent presentation on the display, wherein the first and second windows, when presented, are non-obscuring of each other, and wherein, when presented, locations of the first and second windows are based on control input;* wherein the control input is [at least one of: a control code contained in the closed captioned data and] a control signal, wherein the control input further controls at least one of size of the first window, size of the second window, size of text of the decoded closed captioned data, color of the text of the decoded closed captioned data, background of the second window and display mode of the decoded captioned data.

3. The method of claim [1] *2,* wherein the display comprises a computer display or a television, and wherein the second window is located above, below, or to a side of the first window on the display.

4. The method of claim [1] *2* further comprises:

locking a phase locked loop to a run-in signal of the closed captioned data, obtaining data bits of the closed caption data by sampling the data bits and computing an average value of several samples of each data bit and determining whether each of the data bits is a zero or a one based on the average value being above or below a predetermined threshold.

5. A [The] method [of claim 4,] *for providing captioned data and video data on a display, the method comprises the steps of:*

*a) receiving a video signal that includes the closed captioned data and the video data;*

*b) decoding the closed captioned data to produce decoded closed captioned data;*

*c) digitizing the video data to produce digital video data;*

*d) associating the digital video data in a first window on the display;*

*e) associating the decoded closed captioned data in a second window for subsequent presentation on the display, wherein the first and second windows, when presented, are non-obscuring of each other, and wherein, when presented, locations of the first and second windows are based on control input;*

*locking a phase locked loop to a run-in signal of the closed captioned data, and*

*obtaining data bits of the closed caption data by sampling the data bits and computing an average value of several samples of each data bit and determining whether each of the data bits is a zero or a one based on the average value being above or below a predetermined threshold* wherein the data bits comprise a pair of bytes of data representing at least one of characters and captioning code, further including passing the bytes of data to a computer microprocessor, determining whether the bytes of data are captioning code and if so controlling at least one of a display cursor position on said auxiliary screen, character color, and style of subsequent characters to be displayed by means of said microprocessor, determining whether the bytes of data are character data and if so displaying corresponding characters in sequence on the second window starting at either of a default cursor position or at a cursor position designated by the captioning code if preceded by a cursor position indicating captioning code.

6. The method of claim [1] *2* further comprises storing the decoded closed captioned data such that, at a subsequent time, a transcript of the closed captioned data may be obtained.

7. A method of providing closed captioned data to a television viewer comprising:

(a) detecting closed captioned data signals transmitted in conjunction with a television signal, (b) decoding said data signals to caption display signals, (c) displaying said caption display signals on an auxiliary screen separate from a screen displaying said television signals, (d) providing said caption display signals to a computer microprocessor, (e) processing said caption display signals to control at least one of font and size of said caption display signals, (f) in which the closed captioned data signal includes an initial sinusoidal run-in signal followed by data bits, and (g) in which the detection step includes locking a phase locked loop to the run-in signal, locating the data bits and obtaining closed captioned data bits by sampling the data bits and computing the average value of several samples in the location of each data bit and determining whether each data bit is a zero or a one based on the average value being above or below a predetermined threshold.

8. A method defined in claim 7 in which the data bits comprise a pair of bytes of data representing at least one of characters and captioning code, further including passing the bytes of data to a computer microprocessor, determining whether the bytes of data are captioning code and if so controlling at least one of a display cursor position on said auxiliary screen, character color, and style of subsequent characters to be displayed by means of said microprocessor, determining whether the bytes of data are character data and if so displaying corresponding characters in sequence on said auxiliary screen starting at either of a default cursor position or at a cursor position designated by the captioning code if preceded by a cursor position indicating captioning code.

*9. A method for providing closed captioned data and video data on a display, the method comprises the steps of:*

*a) receiving a video signal that includes the closed captioned data and the video data;*

*b) decoding the closed captioned data to produce decoded closed captioned data;*

*c) digitizing the video data to produce digital video data;*

*d) associating the digital video data in a first window on the display;*

*e) associating the decoded closed captioned data in a second window for subsequent presentation on the display, wherein the first and second windows, when presented, are non-obscuring of each other, and wherein, when presented, locations of the first and second windows are based on control input;*

*wherein the step (d) further comprises:*

*storing the digitized video data in video memory to produce stored video data;*

*retrieving the stored video data from memory to produce retrieved video data;*

*scaling and timing the retrieved video data to be contained within the first window to produce scaled video data; and*

*converting the scaled video data to analog video data, wherein the analog video data is presented on the display in the first window.*

*10. A method for providing closed captioned data and video on a display, the method comprises the steps of:*

*a) receiving a video signal that includes the closed captioned data and the video data;*

*b) decoding the closed captioned data to produce decoded closed captioned data;*

*c) digitizing the video data to produce digital video data;*

*d) associating the digital video data in a first window on the display;*

*e) associating the decoded captioned data in a second window for subsequent presentation on the display, wherein the first and second windows, when presented, are non-obscuring of each other, and wherein, when presented, locations of the first and second windows are based on control input;*

*wherein step (e) further comprises:*

*storing the decoded closed captioned data in video memory to produce stored closed captioned data;*

*retrieving the stored closed captioned data from memory to produce retrieved closed captioned data;*

*scaling and timing the retrieved closed captioned data to be contained within the second window to produce scaled closed captioned data; and*

*converting the scaled closed captioned data to analog closed captioned data, wherein the analog closed captioned data is presented on the display in the second window.*

*11. An apparatus for displaying closed captioned data and video data comprises:*

*video interface circuit operably coupled to receive a video signal that includes the closed captioned data and the video data, wherein the video interface circuit digitizes the video data to produce digital video data and decodes the closed captioned data or produce decoded closed captioned data; and*

*a graphics control circuit operable to generate a first and second windows, wherein the graphics control circuit associates the digital video data with the first window and associates the decoded closed captioned data with the second window, wherein the first and second windows are non-obscuring of each other, and wherein locations of the first and second windows are based on control input;*

*wherein the control input is a control signal, wherein the control input further controls at least one of: size of the first window, size of the second window, and size of text of the decoded closed captioned data, color of the text of the decoded closed captioned data, background of the second window and display mode of the decoded closed captioned data.*

*12. The apparatus of claim 13 further comprises video memory operably coupled to the video interface and the graphics control circuit, wherein the video memory store the digital video data and the decoded closed captioned data prior to being placed in the first and second windows.*

*13. An apparatus for displaying closed captioned data and video data comprises:*

*video interface circuit operably coupled to receive a video signal that includes the closed captioned data and the*

*video data, wherein the video interface circuit digitizes the video data to produce digital video data and decodes the closed captioned data to produce decoded closed captioned data;*

*a graphics control circuit operable to generate a first and second windows, wherein the graphics control circuit associates the digital video data with the first window and associates the decoded closed captioned data with the second window, wherein the first and second windows are non-obscuring of each other, and wherein location of the first and second windows are based on control input; and*

*a random access memory digital to analog converter operably coupled to the graphics control circuit, wherein the random access memory digital to analog converter converts the digital video data and the decoded closed captioned data in to analog video signals and analog closed captioned signals, respectively, that are provided to a display, such that the display presents the first and second windows.*

*14. The apparatus of claim 11, wherein the display comprises a computer display or a television, and wherein the second window is located above, below, or to a side of the first window on the display.*

*15. The apparatus of claim 13, wherein the graphics control circuit associates the digital video data with the first window by:*

*storing the digitized video data in video memory to produce stored video data;*

*retrieving the stored video data from memory to produce retrieved video data;*

*scaling and timing the retrieved video data to be contained within the first window to produce scaled video data; and*

*providing the scaled video data to the random access memory digital to analog converter to produce the analog video data, wherein the analog video data is presented on the display in the first window.*

*16. An apparatus for displaying closed captioned data and video data comprises:*

*video interface circuit operably coupled to receive a video signal that includes the closed captioned data and the video data, wherein the video interface circuit digitizes the video data to produce digital video data and decodes the closed captioned data to produce decoded closed captioned data; and*

*a graphics control circuit operable to generate a first and second windows, wherein the graphics control circuit associates the digital video data with the first window and associates the decoded closed captioned data with the second window, wherein the first and second windows are non-obscuring of each other, and wherein locations of the first and second windows are based on control input;*

*wherein the graphics control circuit associates the decoded closed captioned data with the second window by:*

*storing the decoded closed captioned data in video memory to produce stored closed captioned data;*

*retrieving the stored closed captioned data from memory to produce retrieved closed captioned data;*

*scaling and timing the retrieved closed captioned data to be contained within the second window to produce scaled closed captioned data; and*

*providing the scaled closed captioned data to the random access memory digital to analog converter to produce the analog closed captioned data, wherein the analog closed captioned data is presented on the display in the second window.*

*17. A digital storage medium that stores programming instructions that, when executed by a computer, cause the computer to provide non-obscuring closed captioned data, the digital storage medium comprises:*

*a first storage means for storing programming instructions that cause the computer to receive a video signal that includes the closed captioned data and the video data;*

*a second storage means for storing programming instructions that cause the computer to decode the closed captioned data to produce decoded closed captioned data;*

*a third storage means for storing programming instructions that cause the computer to digitize the video data to produce digital video data;*

*a fourth storage means for storing programming instructions that cause the computer to associate the digital video data in a first window on the display;*

*a fifth storage means for storing programming instructions that cause the computer to associate the decoded closed captioned data in a second window for subsequent presentation on the display, wherein the first and second windows, when presented, are non-obscuring of each other, and wherein, when presented, locations of the first and second windows are based on control input.*

*18. The digital storage medium of claim 17, further comprises means for storing programming instructions that cause the computer to identify the control input as at least one of: a control code contained in the closed captioned data and a control signal, wherein the control input further controls at least one of: size of the first window, size of the second window, size of text of the decoded closed captioned data, color of the text of the decoded closed captioned data, background of the second window and display mode of the decoded closed captioned data.*

*19. The digital storage medium of claim 17 further comprises means for storing programming instructions that cause the computer to provide the first and second windows to a computer display or a television, wherein the second window is located above, below, or to a side of the first window on the display.*

*20. The apparatus of claim 11 wherein the control signal is user controllable.*

*21. The apparatus of claim 2 wherein the control signal is user controllable.*

* * * * *